United States Patent [19]

Kamada et al.

[11] 4,296,214

[45] Oct. 20, 1981

[54] METHACRYLIC RESIN HAVING A HIGH SOLAR RADIANT ENERGY ABSORBING PROPERTY AND PROCESS FOR PRODUCING THE SAME

[75] Inventors: Kazumasa Kamada; Yoshio Nakai; Kazunori Abe, all of Ootake, Japan

[73] Assignee: Mitsubishi Rayon Co., Ltd., Tokyo, Japan

[21] Appl. No.: 139,441

[22] Filed: Apr. 11, 1980

[30] Foreign Application Priority Data

Apr. 20, 1979 [JP] Japan .................................. 54-49240

[51] Int. Cl.³ .......................... C08K 5/09; C08K 5/52
[52] U.S. Cl. .................................. 525/2; 260/23 AR; 260/42.52; 260/45.7 PH; 260/45.75 C; 428/542; 525/1; 525/4; 525/6; 526/164; 526/192; 526/193; 526/218; 526/228; 526/232; 526/329.7
[58] Field of Search ....... 260/23 AR, 42.52, 45.7 PH, 260/45.75 C; 525/1, 2, 4, 6; 526/164, 192, 193, 329.7, 218, 228, 232

[56] References Cited

U.S. PATENT DOCUMENTS

| | | | |
|---|---|---|---|
| 3,355,418 | 11/1967 | Oldsberg | 526/329.7 |
| 3,647,729 | 3/1972 | Nagai et al. | 260/23 AR |
| 3,950,314 | 4/1976 | Graff | 526/329.7 |

FOREIGN PATENT DOCUMENTS

| | | | |
|---|---|---|---|
| 832319 | 4/1960 | United Kingdom | 526/329.7 |
| 1176681 | 1/1970 | United Kingdom | 526/329.7 |

*Primary Examiner*—John Kight III
*Attorney, Agent, or Firm*—Brumbaugh, Graves, Donohue & Raymond

[57] ABSTRACT

A methacrylic resin having a high solar radiant energy absorbing property wherein an organic compound (A) containing cupric ion and a compound (B) having at least one P-O-H bond in a molecule are contained into the methacrylic resin selected from poly(methyl methacrylate) or methacrylic polymers containing at least 50% by weight of a methyl methacrylate unit. A process for producing said methacrylic resin is also disclosed.

22 Claims, 3 Drawing Figures

| | | | | |
|---|---|---|---|---|
| A | EXAMPLE | 3 | a | CONTROL 1 |
| B | EXAMPLE | 4 | b | CONTROL 2 |
| C | EXAMPLE | 5 | c | CONTROL 3 |
| | | | d | CONTROL 4 |

| | | | | |
|---|---|---|---|---|
| A | EXAMPLE 3 | a | CONTROL | 1 |
| B | EXAMPLE 4 | b | CONTROL | 2 |
| C | EXAMPLE 5 | c | CONTROL | 3 |
| | | d | CONTROL | 4 |

| | | | | | |
|---|---|---|---|---|---|
| A | EXAMPLE | 9 | a | CONTROL | 5 |
| B | EXAMPLE | 10 | b | CONTROL | 6 |
| C | EXAMPLE | 11 | c | CONTROL | 7 |
| D | EXAMPLE | 12 | d | CONTROL | 8 |
| E | EXAMPLE | 13 | e | CONTROL | 9 |

METHACRYLIC RESIN HAVING A HIGH SOLAR RADIANT ENERGY ABSORBING PROPERTY AND PROCESS FOR PRODUCING THE SAME

This invention relates to a novel methacrylic resin having a high solar radiant energy absorbing property and a process for producing the same. More specifically this invention relates to a methacrylic resin shaped article having a high solar radiant energy absorbing property and containing an organic compound containing cupric ion and a compound having at least one P—O—H bond in a molecule and a process for producing the same by polymerizing a polymerizable unsaturated monomer having methyl methacrylate as a main component in the presence of an organic compound containing cupric ion and a compound having at least P—O—H bond in a molecule.

A methacrylic resin has an excellent transparency and weather-ability. Therefore it has come to be used for so-called grazing uses such as windows, ceiling windows, doors of buildings and vehicles. But it has a defect that it transmission of solar radiant energy is so high that, for example, in case it is exposed to the direct sunshine, the internal temperature rise will be noticeable.

In order to control the internal temperature rise, such measures as further fitting a blind inside the window or cooling the room have been taken. However, in case the blind is fitted, it will become dark in the room, and it will become hard to see outside through the window, and thus the high transparency of the methacrylic resin will become of no use. Further, cooling the room is essentially undesirable from the standpoint of saving energy.

Under the above mentioned circumstances, it has been attempted to effectively lower the transmission of solar radiant energy by modifying the methacrylic resin itself while preventing the reduction of the visible light transmission. In the present invention, a resin is called to have a high solar radiant energy absorbing property, when it absorbs comparatively much of the solar radiant energy in spite of high visible light transmission.

The spectral distribution of the solar radiant energy and the relative luminous efficiency are mentioned in various literature. For example, in JIS R3208 "Heat Ray Absorbing Glass," the spectral distribution of the solar radiant energy and the relative luminous efficiency are described in detail. According to the spectral distribution of the solar radiant energy by JIS R3208, more than 80% of the solar radiant energy is occupied by the rays in the wave length range of 400 to 1,100 nm (nanometers). From the relative luminous efficiency defined in JIS R3208, it is found that the visible light transmission is determined substantially by the transmission of the light in the wave length range of 500 to 650 nm.

When it is considered that the light in the wave length range longer than 1,100 nm are absorbed somewhat strongly by polymethyl methacrylate and that the light in the wave length range shorter than 400 nm can be substantially absorbed by adding a commercial ultraviolet light absorbent properly into a methacrylic resin, it will be considered that, in order to effectively lower the solar radiant transmission while preventing the reduction of the visible light transmission, it will be a favorable method to add a substance which selectively strongly absorbs the light in the wave length range of 400 to 500 nm and 650 to 1,100 nm into a methacrylic resin.

By adding into a resin a suitable commercial yellow dye, we can make it possible for the resin article to absorb selectively and strongly the light in the wavelength range of 400 to 500 nm. However, in this case, the resin will be unavoidably colored yellow, or if any other colored substance is present, a color combined with it. Therefore, only in case the yellowing of the resin is not unsuitable, it will be a desirable method to obtain a resin of a low transmission of the light in the wave length range of 400 to 500 nm by suitably adding a yellow dye into the resin article. However, unless it is used together with the method of lowering the transmission of the light in the wave length range of 650 to 1,100 nm, the solar radiant energy absorbing property will not be sufficient in practical use.

By adding into a resin a suitable commercial blue or greenish dye, we can make it possible for the resin to absorb somewhat the light in the wave length range of 650 to 1,100 nm. However, though the reduction of the visible light transmission is large, the lowering of the solar radiant transmission is small, and therefore no sufficient solar radiant energy absorbing property can be given.

As other methods, for example, there are suggested a method wherein an organic compound of nickel is added into a methacrylic resin as in U.S. Pat. No. 3,647,729 and a method wherein an organic compound of nickel, cobalt or copper and unsaturated carboxylic acid as in Japanese Patent Application Kokai (Laid-open) No. 5888/1973 are contained.

However, the above mentioned known techniques have no sufficient performance and are not practical. That is to say, the absorbance of Ni (II) (bivalent nickel ion) is so small, that in order to absorb sufficiently the solar radiant energy, we must add a large amount of an organic compound containing Ni (II), and the result is that the physical properties such as mechanical strength of the resin reduce, irrespective of the existance of unsaturated carboxylic acid.

Further, there are defects that, in case an organic compound of cobalt or copper and unsaturated carboxylic acid are added into a methacrylic resin, if the amount of addition of the organic compound of cobalt or copper is increased so as to sufficiently lower the solar radiant energy transmission, at the same time, the reduction of the visible light transmission will be also large and no favorable solar radiant energy absorbing property can be given.

As a result of investigations to overcome the defects of such conventional techniques as are mentioned above, it has now been found that, when both of an organic compound containing a specified amount of cupric ion and a compound having at least one P—O—H bond in a molecule are contained in a methacrylic resin, the above mentioned defects will all be solved and a methacrylic resin property having a high solar radiant energy absorbing property will be obtained.

That is to say, the subject matter of the present invention is a methacrylic resin having a high solar radiant energy absorbing property wherein an organic compound (A) containing cupric ion in an amount of 0.01 to 5 parts by weight calculated as cupric ion and a compound (B) having at least one P—O—H bond in a molecule in an amount to be 0.1 to 10 mols per mol of the above mentioned organic compound (A) are contained per 100 parts by weight of a methacrylic resin selected from homopolymers of methyl methacrylate or copolymers of polymerizable unsaturated monomer mixture containing at least 50% by weight of a methyl methacrylate and a process for producing methacrylic resin having a high solar radient energy absorbing property which comprises polymerizing a polymerizable material selected from methyl methacrylate or a polymerizable unsaturated monomer mixture containing at least 50% by weight of methyl methacrylate or its partially polymerized product, including an organic compound (A) containing cupric ion in an amount of 0.01 to 5 parts by weight calculated as cupric ions per 100 parts by weight of above mentioned polymerizable material and a compound (B) having at least one P—O—H bond in a molecule in an amount to be 0.1 to 10 mols per mol of the above mentioned organic compound (A) in the presence of a radical polymerization initiator.

Figure 1:
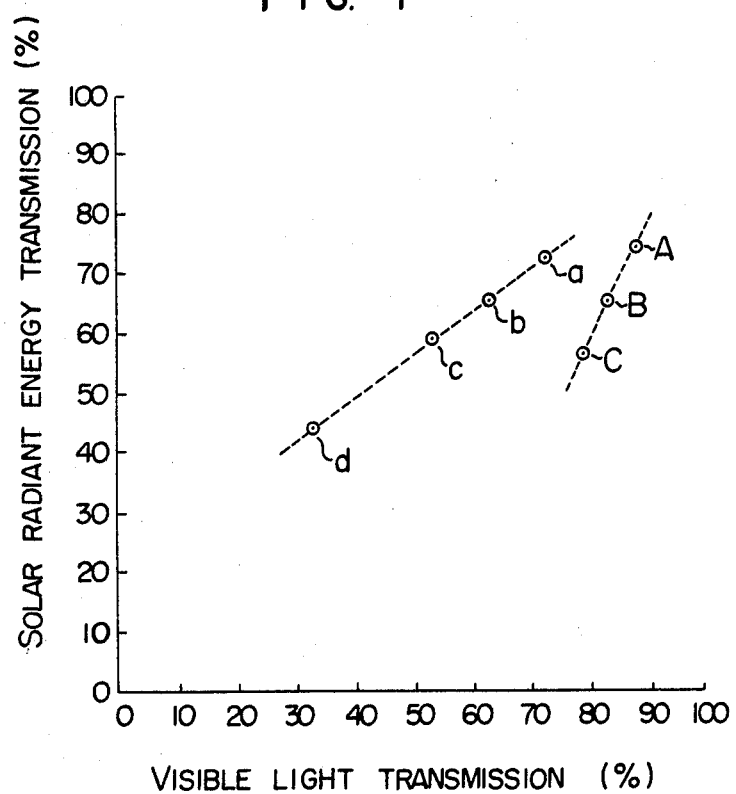
FIGS. 1 and 3 are graphs showing relationships between visible light transmission and solar radiant energy transmission of several resin plates.

Though the methacrylic resin having a high solar radiant energy absorbing property according to the present invention can be obtained by any process, it is desirable to obtain the above mentioned composition by a bulk polymerization or preferably a mold polymerization.

The polymerizable raw material to be used in the production of the resin of the present invention is methyl methacrylate alone or a polymerizable unsaturated monomer mixture containing at least 50% by weight of methyl methacrylate or its partially polymerized product. As specific examples of the polymerizable unsaturated monomer copolymerizable with methyl methacrylate, there can be enumerated (meth)acrylic acid (meaning acrylic acid or methacrylic acid here and hereinafter); esters of (meth)acrylic acid and alcohol represented by methyl acrylate, ethyl(meth)acrylate, butyl(meth)acrylate, stearyl (meth)acrylate, 2-ethylhexyl(meth)acrylate ethyleneglycol di(meth)acrylate, di-ethyleneglycol di(meth)acrylate, tetraethyleneglycol di(meth)acrylate, trimethylolethane tri(meth)acrylate, trimethylolpropane tri(meth)acrylate, pentaerythritol tetra(meth)acrylate and allyl (meth)acrylate, 2-hydroxyethyl (meth)acrylate; (meth)acrylamide and its derivatives; styrene and its derivatives; and vinyl acetate. In the present invention, in case a polymerizable unsaturated monomer mixture containing at least 50% by weight of methyl methacrylate is used as a polymerizable raw material, it will be more preferable to contain at least 60% by weight, or further at least 80% by weight of methyl methacrylate. A mixture of 85 to 100% by weight of methyl methacrylate in this range and 0 to 15% by weight of a member selected from among methyl acrylate, ethyl acrylate, butyl acrylate, (meth)acrylic acid and 2-hydroxyethyl (meth)acrylate or a mixture of them is particularly preferable.

In the case where a partially polymerized product is used as a polymerizable raw material, as a preferable example for obtaining it, there is a method of obtaining the partially polymerized product which contains 5 to 35% by weight of polymers by polymerizing methyl methacrylate or the mixture of it and the other unsaturated monomers in the bulk state at their boiling point.

As preferable specific examples of the organic compound (A) containing cupric ion to be used in the present invention, there can be enumerated salts of such carboxylic acids as formic acid, acetic acid, propionic acid, valeric acid, hexanoic acid, octanoic acid, decanoic acid, lauric acid, stearic acid, oleic acid, 2-ethylhexanoic acid, naphthenic acid and benzoic acid and cupric ion and complex salts of acetylacetone or acetoacetic acid and cupric ion. In the present invention, the organic compound (A) containing cupric ion is added into the resin in an amount of 0.01 to 5 parts by weight calculated as cupric ion per 100 parts by weight of methyl methacrylate or a polymerizable unsaturated monomer mixture containing at least 50% by weight of methyl methacrylate or its partially polymerized product. In case the amount of the organic compound containing cupric ion does not reach 0.01 part by weight calculated as cupric ion, the solar radiant absorbing property of the resin will not be sufficient. On the other hand, in case it exceeds 5 parts by weight, such physical properties as the mechanical strength of the resin will be noticeably reduce. It is preferable to add 0.025 to 0.5 part by weight calculated as cupric ion within the above mentioned range of the amount of the organic compound containing cupric ion.

As preferable specific examples of the compound (B) having at least one P—O—H bond in a molecule to be used in the present invention, there can be enumerated such derivatives of phosphoric acid represented by the following formula

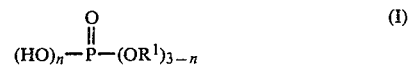

(wherein $R^1$ is selected from alkyl, allyl, aryl, aralkyl, alkaryl and (meth)acryloxyalkyl radicals of 1 to 18 carbon atoms and their derivatives and n is 1 or 2) as, for example, ethyl phosphate (meaning monoethyl phosphate here and hereinafter), di-ethyl phosphate, butyl phosphate, di-butyl phosphate, hexyl phosphate, di-hexyl phosphate, heptyl phosphate, di-heptyl phosphate, octyl phosphate, di-octyl phosphate, lauryl phosphate, di-lauryl phosphate, stearyl phosphate, di-stearyl phosphate, 2-ethylhexyl phosphate, bis(2-ethylhexyl) phosphate, oleyl phosphate, di-oleyl phosphate, phenyl phosphate, di-phenyl phosphate, nonylphenyl phosphate, bis(nonylphenyl)phosphate, 2-chlorethyl phosphate, bis(2-chlorethyl)phosphate, 2,3-dichloropropyl phosphate and bis(2,3-dichloropropyl) phosphate or γ-methacryloxypropyl phosphate and bis(γ-methacryloxypropyl) phosphate; and such derivatives of phosphorous acid represented by the following formula

(wherein $R^1$ and n are respectively the same as are defined in the above mentioned formula (I)) as, for example, ethyl phosphite, di-ethyl phosphite, butyl phosphite, di-butyl phosphite, hexyl phosphite, di-hexyl phosphite, heptyl phosphite, di-heptyl phosphite, octyl phosphite, di-octyl phosphite, lauryl phosphite, dilauryl phosphite, stearyl phosphite, di-stearyl phosphite, 2-ethylhexyl phosphite, bis(2-ethylhexyl) phosphite, oleyl phosphite, di-oleyl phosphite, phenyl phosphite, di-phenyl phosphite, nonylphenyl phosphite, bis(nonylphenyl) phosphite, 2-chlorethyl phosphite, bis(2-chlorethyl) phosphite, 2,3-dichloropropyl phosphite and bis(2,3-dichloropropyl) phosphite or γ-methacryloxypropyl phosphite and bis(γ-methacryloxypropyl) phosphite etc. can be enumerated as a concrete example.

In the present invention, the compound (B) having at least one P—O—H bond in a molecule is added in an amount of 0.1 to 10 mols per mole of the organic compound containing cupric ion. In case it is less than 0.1 mol, the solar radiant energy absorbing property will not sufficiently improve. On the other hand, in case it exceeds 10 mols, the mechanical strength of the obtained resin material will noticeably reduce. With the increase of the amount of the compound having at least one P—O—H bond in a molecule within the above mentioned range of 0.1 to 10 mols, the solar radiant energy absorbing property will be gradually improved but, at the same time, with the increase of the amount of addition, the mechanical strength of the resin may be reduced. Therefore, the amount of the compound having at least one P—O—H bond in a molecule may be decided by properly judging the relation between the degree of the improvement of the solar radiant energy absorbing property and other physical properties.

In working the present invention, by using as a cosolvent the compound having at least one P—O—H bond in a molecule and (meth)acrylic acid or 2-hydroxyethyl (meth)acrylate in case it is used, the organic compound containing cupric ion is dissolved in an unsaturated monomer having methyl methacrylate as a main component or its partially polymerized product. However, depending on the kind and amount of the organic compound containing cupric ion, the solubility may be insufficient. Therefore, in this case, in order to improve the solubility of the cupric ion, it is preferable to add a compound selected from such carboxylic acids as formic acid, acetic acid, propionic acid, hexanoic acid, octanoic acid, decanoic acid, lauric acid, stearic acid, 2-ethylhexanoic acid, naphthenic acid and benzoic acid or such alcohols as octyl alcohol, lauryl alcohol, ethyleneglycol, diethyleneglycol and tetraethyleneglycol by preferably at most 5 parts by weight or more preferably at most 2 parts by weight per 100 parts by weight of methyl methacrylate or a polymerizable unsaturated monomer mixture having methyl methacrylate as a main component or its partially polymerized product.

In working the present invention, not only such respective components as are described above but also various additives used in producing ordinary methacrylic resin may be added. As specific examples of such additives, there can be enumerated dyes and pigments used for coloring, antioxidants, such stabilizers as ultraviolet ray absorbent, flameretardants, plasticizers and mold releasers making it easy to release the resin material from the mold.

Among these additives, it is preferable to add an ultraviolet ray absorbent to a resin in order to prevent such deteriorations as the discoloration, crazing and skin roughening of the resin article caused by ultraviolet light. Further, the addition of the ultraviolet ray absorbent can reduce the solar radiation transmission without reducing the visible light transmission of the resin article and is therefore preferable from the point of improving the solar radiant energy absorbing property.

The performances required of such ultraviolet ray absorbent to be used are to absorb fully rays in the wavelength range deteriorating the resin plate and not to react with cupric ion to form a complex hardly soluble in a polymer having methyl methacrylate unit as a main component. As specific examples of ultraviolet ray absorbent having such performances, the following can be enumerated: 2-hydroxybenzophenone derivatives as 2-hydroxy-4-methoxybenzophenone, 2-hydroxy-4-octyloxybenzophenone, 2-hydroxy-4-decyloxybenzophenone, 2-hydroxy-4-dodecyloxybenzophenone, 2-hydroxy-4,4'-dimethoxybenzophenone, 2-hydroxy-4,4'-dibutoxybenzophenone, 2-hydroxy-4,4'-dioctyloxybenzophenone, 2-hydroxy-4-methoxy-4'-chlorobenzophenone, 2-hydroxy-4-methoxy-2',4'-dichlorobenzophenone and 2-hydroxy-4-methoxy2'-carboxybenzophenone, such benzotriazole derivatives as 2-(2'-hydroxy-3',5'-ditertiarybutylphenyl)benzotriazole, 2-(2'-hydroxy-3',5'-ditertiarybutylphenyl) 3-chlorobenzotriazole and 2-(2'-hydroxy-3',5'-di(2'',2''-dimethyl propyl)-phenyl)benzotriazole and such salicylic acid esters as phenyl salicylate, p-ethylphenyl salicylate and p-tertiarybutylphenyl salicylate. It is preferable to add 0.01 to 1 part by weight of an ultraviolet ray absorbent to be used per 100 parts by weight of a polymer having methyl methacrylate unit as a main component. It is more preferable to add 0.1 to 0.5 part by weight of it.

Further, among the additives into the resin, if a yellow dye is added, the solar radiant energy absorbing property of the resin will improve. Therefore, if in the quantitative range not obstructing the object of the present invention, it can be enumerated as an example of a preferable additive.

Among the dyes and pigments to be used to color the resin, carbon black gives an antiglaring effect antiglaring to the resin and has an absorption over the entire wave length range of solar radiation rays from 290 to 2,140 nm. Therefore, if carbon black is added in the method of the present invention, a resin having high antiglare property and solar radiant energy absorbing property will be obtained. Therefore, a method wherein 0.0001 to 0.05 part by weight of carbon black is added per 100 parts by weight of a polymer having methyl methacrylate unit as a main component can be enumerated as one of preferable working examples of the present invention. Therefore, they can be enumerated as examples of preferable additives within the quantitative range not obstructing the objects of the present invention.

Further, when the methacrylic resin of the present invention is polymerized, such radical polymerization initiator as azo compound or an organic peroxide is preferably used by 0.0001 to 0.5 part by weight, or more preferably used by 0.001 to 0.2 part by weight per 100 parts by weight of methyl methacrylate or polymerizable unsaturated monomer mixture containing at least 50% by weight of methyl methacrylate, or its partially polymerized material.

As specific examples of the azo compound used as a radical polymerization initiator, there can be enumerated 2,2'-azobis (isobutylonitrile), 2,2'-azobis (2,4-dimethylvaleronitrile) and 2,2'-azobis(2,4-dimethyl, 4-methoxyvaleronitrile).

On the other hand, as specific examples of organic peroxides, there can be enumerated di-tertiarybutyl peroxide, tertiarybutylcumyl peroxide, dicumyl peroxide, α,α'-bis(tertiarybutylperoxide) hexane, α,α'-bis(tertiarybutylperoxy) p-isopropylbenzene, 2,5-dimethyl-2,5-di(tertiarybutylperoxy) hexane, 2,5-dimethyl-2,5-di(tertiarybutylperoxy) hexine-3, tertiarybutyl peroxyacetate, tertiarybutyl peroxyisobutylate, tertiarybutyl peroxypivalate, tertiarybutyl-2-ethyl hexanoate, tertiarybutyl peroxylaurate, tertiarybutyl peroxybenzoate, ditertiarybutyl diperoxyphthalate, 2,5'-dimethyl-2,5-di(-benzoyl peroxy) hexane, tertiarybutyl peroxymaleic acid, tertiarybutyl peroxyisopropylcarbonate, lauroyl peroxide, stearoyl peroxide, 3,5,5-trimethylhexanoyl peroxide, succinic acid peroxide, benzoyl peroxide, p-chlorobenzoyl peroxide, 2,4-dichlorobenzoyl peroxide, di-isopropyl peroxydicarbonate, di-2-ethylhexyl peroxydicarbonate, acetyl peroxide, propionyl peroxide, isobutyl peroxide, octanoyl peroxide, decanoyl peroxide and acetylcyclohexylsulfonyl peroxide.

Each of the above mentioned radical polymerization initiators may be used alone or two or more of them may be used together.

The decoloration due to heat of the resin to which at least one member selected from the group consisting of di-tertiarybutyl peroxide, tertiarybutylcumyl peroxide, dicumyl peroxide, $\alpha,\alpha'$-bis(tertiarybutylperoxide) hexane, $\alpha,\alpha'$-bis(tertiarybutylperoxy) p-isopropylbenzene, 2,5-dimethyl-2,5-di(tertiarybutylperoxy) hexane and 2,5-dimethyl-2,5-di(tertiarybutylperoxy) hexine-3 among the organic peroxides is added with said other polymerization initiator is much lower at the time of the heat molding than a resin to which such organic peroxide is not added. Therefore, it is preferable to add one or more of the above mentioned organic peroxides to a resin to be heat molding and it is more preferable to add 0.05 to 1 part by weight or more preferably 0.1 to 0.5 part of an organic peroxide selected from the above mentioned di-tertiarybutyl peroxide, tertiarybutylcumyl peroxide and dicumyl peroxide per 100 parts by weight of a polymer having methyl methacrylate unit as a main component.

As a specific polymerizing method in the case of producing a methacrylic resin article by casting polymerization, there can be enumerated a method wherein the above mentioned composition is poured in between two opposed tempered glass plates sealed with a gasket at the circumference of the glass plate in an ordinary manner and is heated, or a method wherein the composition is continuously poured from upper stream into a space sealed with two endless belts mirror-polished on one surface and gaskets advancing at the same speed in the same direction and is heated to be continuously polymerized.

Although polymerization is carried out at various temperature, depending on the kind of the radical polymerization initiator, generally at the temperature range of 40° to 140° C., it is preferably, that the polymerization is carried out, at first at the temperature range of 40° to 90° C., and in succession at the temperature range of 100° to 140° C.

The thickness of the resin plate obtained by the casting polymerization is not particularly limited but is preferably the thickness of an ordinarily commercial methacrylic resin plate, that is, within the range of 1 to 65 mm.

The present invention shall be explained in the following concrete examples in which the parts represent parts by weight and the rate of visible light transmission and the rate of solar radiant energy transmission are calculated in accordance with the method of JIS R 3208 using the absorption spectrum converted to that for a specimen of 5 mm thick, the wavelength being devided 10 nm width.

EXAMPLE 1

A composition consisting of

| | |
|---|---|
| methyl methacrylate | 100 parts, |
| cupric acetate (Cu(CH$_3$COO)$_2$H$_2$O) | 0.2 part, |
| a mixture of 2-ethylhexyl phosphate and bis(2-ethylhexyl) phosphate (of trade name "JP508" made by Johoku Chemical Industrial Co.) | 0.2 part, |
| 2-ethylhexonic acid | 1 part, |
| Tinuvin-P (ultraviolet ray absorbent made by Ciba Geigy Co.) | 0.01 part, |
| and 2,2'-azobisisobutylonitrile | 0.08 part | was poured in between two tempered glass plates with a gasket at the circumference of the glass plates in an ordinary manner, was dipped for 5 hours in a water bath tub at 65° C., was then heated for 2 hours in an air bath tub at 110° C. to complete polymerization. After cooling it was released from the tempered glass plates to obtain a light blue transparent resin plate of a thickness of 3 mm.

The visible light transmission of this plates was 75.8%, and the solar radiant energy transmission of it was 65.3%, and so it had a high solar radiant energy absorbing property.

EXAMPLE 2

A composition consisting of

| | |
|---|---|
| a partially polymerized product of methyl methacrylate (of a polymer content of 20%) | 100 parts, |
| methacrylic acid | 2 parts, |
| cupric acetate (Cu(CH$_3$COO)$_2$ . H$_2$O) | 0.4 part, |
| di-butyl phosphite | 0.4 part, |
| "Sumiplast Yellow GGN" (yellow dye produced by Sumitomo Chemical Industrial Co.) | 0.005 part, |
| Tinuvin-P | 0.01 part, |
| and 2,2'-azobis(2,4-dimethyl-valeronitrile) | 0.057 part | was continuously poured from upper stream into a space sealed with two endless stainless steel belts mirror-polished on one surface and gaskets advancing at the same speed in the same direction in an ordinary manner, was passed for 28 minutes through a hot water shower zone at 80° C. and was then passed for 14 minutes through a far infrared ray heater heated zone to be heated up to a maximum temperature of 135° C. and a gradually cooling zone to continuously obtain a yellowish green transparent resin plate of a thickness of 4 mm.

The visible light transmission of this plates was 73.2%, and the solar radiant energy transmission of it was 48.9%, and so it had a high solar radiant energy absorbing property.

EXAMPLES 3 to 5

The composition to be poured in was made according to the following composition in which the amounts of the cupric acetate and "JP 504" were made the amounts mentioned in Table 1:

| | |
|---|---|
| methyl methacrylate | 100 parts, |
| cupric acetate (Cu(CH$_3$COO)$_2$ . H$_2$O) | varied amount |
| a mixture of butyl phosphate and di-butyl phosphate (of trade name "JP 504" produced by Johoku Chemical Industrial Co.) | varied amount |
| octanoic acid | 2 parts |
| and 2,2'-azobisisobutylonitrile | 0.07 part, |

The composition was poured into a mold to be polymerized in the same manner as in Example 1 to obtain a transparent resin plate of a thickness of 3 mm.

When the visible light transmissions and solar radiant energy transmissions of these resin plates were measured, the results in Table 1 were obtained.

TABLE 1

|  | Amount of cupric acetate (in parts) | Amount of JP504 (in parts) | Visible light transmission (in %) | Solar radiant energy transmission (in %) |
|---|---|---|---|---|
| Example 3 | 0.1 | 0.1 | 88.2 | 74.3 |
| Example 4 | 0.2 | 0.2 | 83.1 | 65.4 |
| Example 5 | 0.4 | 0.4 | 78.7 | 55.5 |

Controls 1 to 4:

The composition to be poured in was of

| methyl methacrylate | 100 parts, |
|---|---|
| cupric acetate ($Cu(CH_3COO)_2 \cdot H_2O$) | varied amount |
| methacrylic acid | 2 parts |
| and 2,2'-azobisisobutylonitrile | 0.07 parts, | had the amount of cupric acetate made the amount mentioned in Table 2 and was poured into a mold in the same manner as in Example 1 to obtain a transparent resin plate of a thickness of 3 mm.

When the visible light transmission and solar radiant energy transmission of these resin plates were measured, the results in Table 2 were obtained.

TABLE 2

|  | Amount of cupric acetate (in parts) | Amount of JP504 (in parts) | Visible light transmission (in %) | Solar radiant energy transmission (in %) |
|---|---|---|---|---|
| Control 1 | 0.05 | 0 | 72.5 | 72.0 |
| Control 2 | 0.1 | 0 | 62.9 | 65.2 |
| Control 3 | 0.2 | 0 | 53.3 | 58.5 |
| Control 4 | 0.4 | 0 | 33.0 | 43.6 |

The results of Examples 3 to 5 together with those of Controls 1 to 4 are shown in FIG. 1 by taking the visible light transmission on the abscissa and the solar radiation transmission on the ordinate.

It was clearly seen from FIG. 1 that the resin plate to which "JP504" was added has much higher visible light transmission than the resin plate to which no "JP 504" was added.

Figure 2:
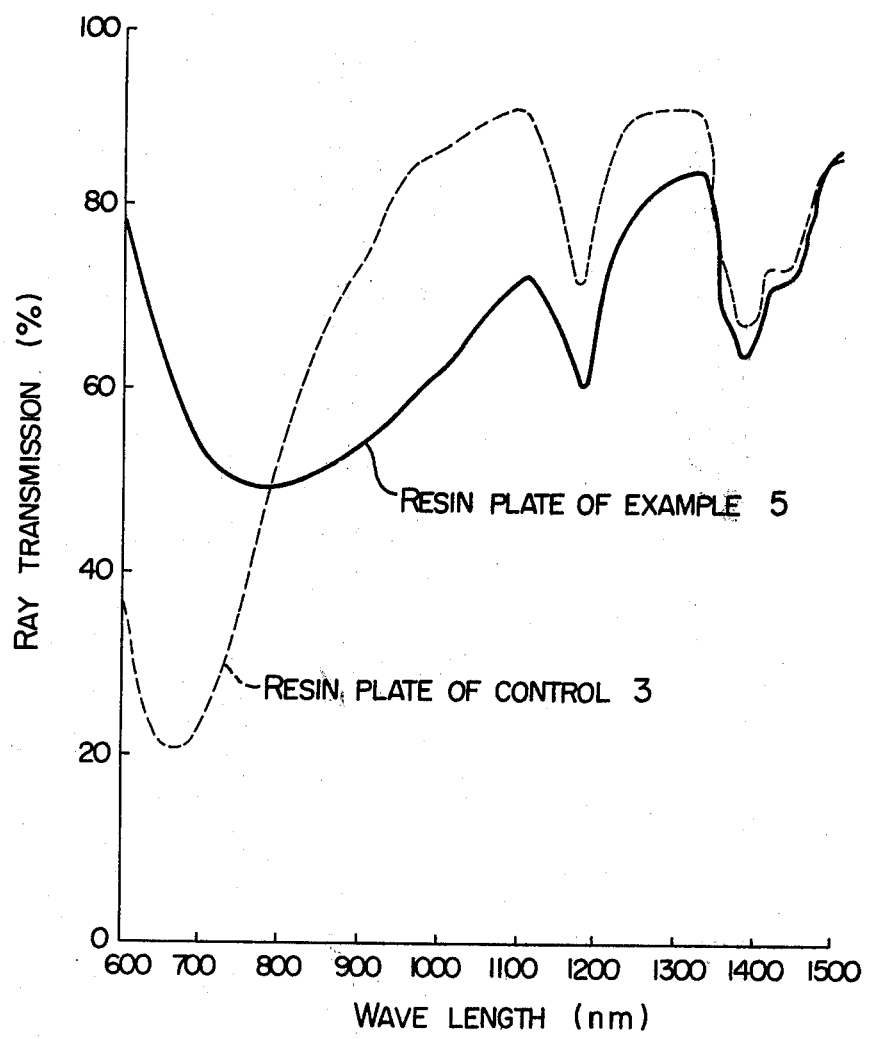
FIG. 2 is a graph showing relationships between wave length and ray transmission of several resin plates.

The spectral transmission curve of 600 to 1,500 nm of the resin plate of a thickness of 3 mm obtained in Example 5 together with the one of Control 3 is shown in FIG. 2.

It is clearly seen from FIG. 2 that, by the addition of "JP504," the absorption by the cupric ion moved to the longer wavelength side.

EXAMPLE 6

Instead of the composition in Example 1, a composition consisting of

| methyl methacrylate | 95 parts, |
|---|---|
| methyl acrylate | 5 parts, |
| cupric oleate ($Cu(C_{18}H_{33}O_2)_2$) | 0.8 part, |
| a mixture of 2-chloroethyl phosphate and bis(2-chloroethyl) phosphate (of tradename "JPC 502" produced by Johoku Chemical Industrial Co.) | 0.4 part |
| and benzoyl peroxide | 0.06 part | was poured in and otherwise the same operation as in Example 1 was repeated to obtain a light blue transparent resin plate.

The visible light transmission of this plates was 76.6%, and the solar radiant energy transmission of it was 62.9%, and so it had high solar radiant energy absorbing property.

EXAMPLE 7

A composition consisting of

| partially polymerized product of methyl methacrylate (of a polymer content of 20%) | 99 parts |
|---|---|
| 2-hydroxyethyl methacrylate | 1 part |
| n-octanoic acid | 2 parts |
| cupric acetate ($Cu(CH_3COO)_2 \cdot H_2O$) | 0.4 part |
| butyl phosphate | 0.06 part |
| di-butyl phosphate | 0.54 part |
| 2-hydroxy-4-methoxybenzophenone | 0.3 part |
| 2,2'-azobis-(2,4-dimethylvaleronitrile) and | 0.026 part |
| benzoyl peroxide | 0.025 part | was poured continuously from upper stream into a space sealed with two endless stainless steel belts each mirror-polished on one surface and gaskets advancing at the same speed in the same direction in an ordinary manner, and was passed for 36.7 minutes through a hot water shower zone at 82° C. and was then passed for 18.3 minutes through a far infrared ray heater heating zone heated to a maximum temperature of 110° C. and a gradually cooling zone to obtain a light bluish green transparent resin plate of a thickness of 5 mm continuously from below.

The visible light transmission of this plate was 76.2% and the solar radiant energy transmission of it was 52.6%, and so it had a high solar radiant energy absorbing property.

When this resin plate was accelerated in the exposure with a weathermeter (Model WE-2 manufactured by Toyo Rika Co.) for 1,100 hours, the visible light transmission of it was 77.4% and the solar radiant energy transmission of it was 54.9% which were not substantially different from those before the exposure and has a high solar radiant energy absorbing property.

Its appearance did not vary not substantially and it was highly weatherproof.

EXAMPLE 8

In the same manner as in Example 7 except that the composition to be poured in was changed to be of

| partially polymerized product of methyl methacrylate (containing 22% polymer | 99.5 parts |
|---|---|
| 2-hydroxyethyl methacrylate | 0.5 part |
| n-hexanoic acid | 1.5 parts |
| cupric formate | 0.5 part |
| di-heptyl phosphate | 0.7 part |
| 2-(2'-hydroxy-3',5'-ditertiary-butylphenyl) benzotriazole | 0.5 part |
| 2,2'-azobis(2,4-dimethyl-valeronitrile) | 0.026 part |

| | |
|---|---|
| lauroyl peroxide | 0.05 part | a light bluish green transparent plate of a thickness of 6 mm was obtained.

The visible light transmission of this resin plate was 77.6% and the solar radiant energy transmission of 53.5% and had a high solar radiant energy absorbing property.

When this resin plate was exposed for one year at an angle of 45 degrees with the horizontal as directed to the south out of doors in Ohtake-shi, Hiroshima-ken, Japan, the visible light transmission of it was 77.6% and the solar radiation transmission of it was 53.6% which were not substantially different from those before the exposure and the plate was not recognized to vary in the appearance and color from before the exposure.

EXAMPLES 9 TO 13

In the same manner as in Example 2 except that the composition to be poured in was made to be of

| | |
|---|---|
| partially polymerized product of methyl methacrylate (of a polymer content of 20%) | 99 parts |
| methacrylic acid | 1 part |
| cupric acetate (Cu(CH$_3$COO)$_2$ . H$_2$O) | 0.2 part |
| dibutyl phosphate | 0.35 part |
| 2-hydroxy-4-octyloxy-benzophenone | 0.2 part |
| carbon black type pigment (Tradename "ANC 901" produced by Toyo Ink Manufacturing Co.) | Varied amount |
| 2,2'-azobis (2,4-dimethyl-valeronitrile) | 0.05 part |
| and | |
| tertiarybutyl peroxyisobutylate | 0.025 part | and the amount of addition of the carbon black type pigment was made the amount mentioned in Table 3, a rather bluish brown transparent resin plate of a thickness of 3 mm was obtained.

The visible light transmission and the solar radiation transmission of these plates were the values shown in Table 3, had high solar radiant energy absorbing property and had an antiglare property.

Controls 5 to 9:

The same operation was repeated except that the cupric acetate and dibutyl phosphate were removed from the composition to be poured in Examples 9 to 13 to obtain a brown transparent resin plate.

The visible light transmission and the solar radiation transmission of the thus obtained resin plates were the values shown in Table 3.

Figure 3:
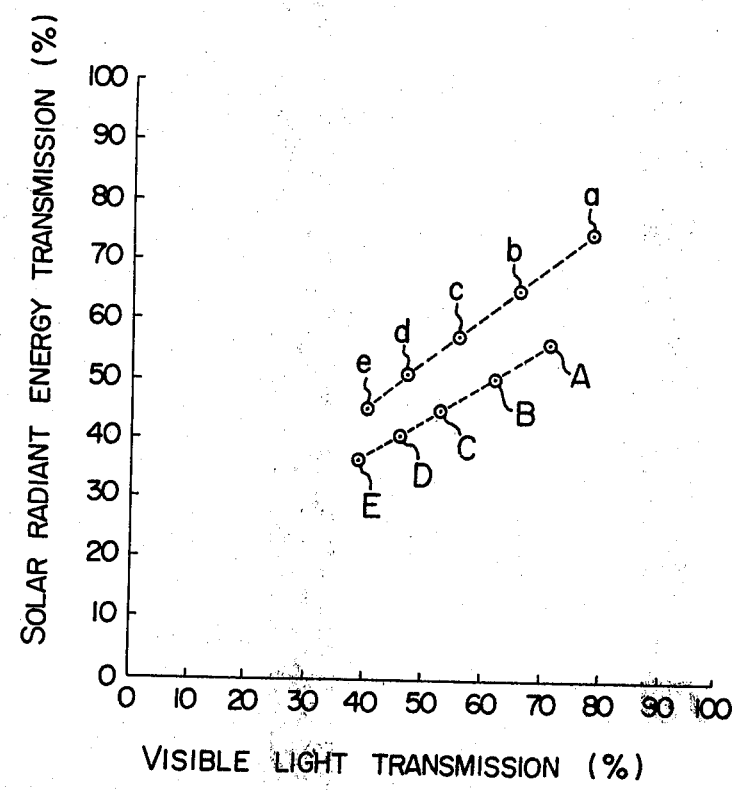

A graph made by plotting the visible light transmissions of the resin plates obtained in Examples 9 to 13 and Controls 5 to 9 on the abscissa and the solar radiant energy transmissions of them on the ordinate is shown in FIG. 3.

It is found from FIG. 3 that the resin plate made by combining the dibutyl phosphate and cupric acetate with carbon black type pigment has a higher solar radiant energy absorbing property than the resin plate made by using the carbon black type pigment alone.

TABLE 3

| | Amount of ANC 901 (in parts) | Amount of cupric acetate (in parts) | Amount of dibutyl phosphate (in %) | Visible light transmission (in %) | Solar radiant energy transmission (in %) |
|---|---|---|---|---|---|
| Example 9 | 0.0023 | 0.2 | 0.35 | 71.1 | 56.3 |
| Example 10 | 0.0046 | " | " | 62.0 | 50.5 |
| Example 11 | 0.0069 | " | " | 52.6 | 45.3 |
| Example 12 | 0.0092 | " | " | 45.7 | 40.8 |
| Example 13 | 0.0115 | " | " | 38.9 | 36.9 |
| Control 5 | 0.0023 | 0 | 0 | 78.2 | 74.8 |
| Control 6 | 0.0046 | " | " | 66.6 | 66.2 |
| Control 7 | 0.0069 | " | " | 55.8 | 58.0 |
| Control 8 | 0.0092 | " | " | 47.1 | 51.3 |
| Control 9 | 0.0115 | " | " | 40.5 | 45.7 |

EXAMPLE 14

The same operation as in Example 1 was repeated except that the composition to be poured in was changed to be

| | |
|---|---|
| partially polymerized product of methyl methacrylate (containing 6.5% polymer) | 100 parts |
| copper acetate | 0.4 part |
| diethylene glycol | 1 part |
| diethyl phosphate | 0.8 part |
| p-tertiarybutylphenyl salicylate | 0.3 part |
| 2,2'-azobis(2,4-dimethylvaleronitrile) and | 0.02 part |
| ditertiarybutyl peroxide | 0.5 part | to obtain a light blue transparent resin plate of thickness of 3 mm.

The visible light transmission of this resin plate was 79.2% and the solar radiation transmission of it was 55.7% and had a high solar radiant energy absorbing property.

When this resin plate was heated for 30 minutes in a hot air circulating furnace warmed to 150° C., the tone did not substantially vary from the tone of the resin plate before being heated, the visible light transmission was 79.5%, the solar radiant energy transmission was 56.2% they did not substantially vary from those before the plate was heated and the solar radiant energy absorbing property was high.

EXAMPLES 15 TO 17

The same operation was repeated except that the di-tertiarybutyl peroxide in Example 14 was changed to the compound mentioned in Table 4 in Example 14 to obtain a light blue transparent resin plate.

The visible light transmissions and solar radiant energy transmissions of such resin plates were the values shown in Table 4 and had a high solar radiant energy absorbing property.

The variation of the tone of the resin plate after the plate was heated for 30 minutes in a hot air circulating furnace warmed to 150° C. in the same manner as in Example 14 is shown in Table 4.

It is found from Table 4 that the resin plates made by adding dicumyl peroxide and tertiarybutylcumyl peroxide are excellent in the heated discoloration resistance.

TABLE 4

| | Amount of the substitute for ditertiarybutyl peroxide in Example 14 (in parts) | Visible light transmission (in %) | Solar radiant energy transmission (in %) | Discoloration by heating |
|---|---|---|---|---|
| Example 15 | Dicumyl peroxide 0.3 | 77.6 | 53.3 | Substantially no discoloration |
| Example 16 | Tertiarybutyl-cumyl peroxide 0.3 | 78.5 | 54.7 | Substantially no discoloration |
| Example 17 | None | 79.4 | 55.8 | The yellowishness became stronger and the discoloration was seen clearly |

What is claimed is:

1. A methacrylic resin having a high solar radiant energy absorbing property wherein an organic compound (A) containing cupric ion in an amount of 0.01 to 5 parts by weight calculated as cupric ion and a compound (B) having at least one P—O—H bond in a molecule in an amount to be 0.1 to 10 mols per mol of the above mentioned organic compound (A) are contained per 100 parts by weight of a methacrylic resin selected from homopolymer of methyl methacrylate or copolymers of polymerizable unsaturated monomer mixture containing at least 50% by weight of a methyl methacrylate.

2. A methacrylic resin having a high solar radiant energy absorbing property according to claim 1, wherein the organic compound (A) containing cupric ion is selected from the group consisting of salts of carboxylic acid and cupric ion, and complex salts of acetylacetone or acetoacetic acid and cupric ion.

3. A methylacrylic resin having a high solar radiant energy absorbing property according to claim 1, wherein the compound (B) having at least one P—O—H bond in a molecule is selected from the group consisting of derivatives of phosphoric acid represented by the following formula

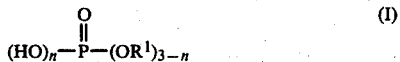

$$(HO)_n\text{—}\overset{\overset{\displaystyle O}{\|}}{P}\text{—}(OR^1)_{3-n} \qquad (I)$$

(wherein $R^1$ is selected from alkyl, allyl, aryl, aralkyl, alkaryl, acryloxyalkyl and methacryloxyalkyl radicals of 1 to 18 carbon atoms and their derivatives and n is 1 or 2) and derivatives of phosphorous acid represented by the following formula

$$(HO)_n\text{—}P\text{—}(OR^1)_{3-n} \qquad (II)$$

(wherein $R^1$ and n are respectively the same as are defined in the above mentioned formula (I)).

4. A methacrylic resin having a high solar radiant energy absorbing property according to claim 2, wherein the carboxylic acid is selected from the group consisting of formic acid, acetic acid, propionic acid, hexanoic acid, octanoic acid, decanoic acid, lauric acid, stearic acid, 2-ethylhexanoic acid, naphthenic acid and benzoic acid.

5. A methacrylic resin having a high solar radiant energy absorbing property according to claim 1, wherein from 0.01 to 1.0 part by weight of an ultraviolet ray absorbent is added per 100 parts by weight of methacrylic resin.

6. A methacrylic resin having a high solar radiant energy absorbing property according to claim 1, wherein from 0.0001 to 0.05 parts by weight of carbon black is added per 100 parts by weight of methacrylic resin.

7. A process for producing methacrylic resin having a high solar radiant energy absorbing property which comprises polymerizing a polymerizable material selected from methyl methacrylate or a polymerizable unsaturated monomer mixture containing at least 50% by weight of methyl methacrylate or its partially polymerized product, including an organic compound (A) containing cupric ion in an amount of 0.01 to 5 parts by weight calculated as cupric ion per 100 parts by weight of above mentioned polymerizable material and a compound (B) having at least one P—O—H bond in a molecule in an amount to be 0.1 to 10 mols per mol of the above mentioned organic compound (A) in the presence of a radical polymerization initiator.

8. A process for producing methacrylic resin having a high solar radiant energy absorbing property according to claim 7, wherein the organic compound (A) containing cupric ion is selected from the group consisting of salts of carboxylic acid and cupric ion, and complex salts of acetylacetone or acetoacetic acid and cupric ion.

9. A process for producing methacrylic resin having a high solar radiant energy absorbing property according to claim 7, wherein the compound (B) having at least one P—O—H bond in a molecule is selected from the group consisting of derivatives of phosphoric acid represented by the following formula

$$(HO)_n\text{—}\overset{\overset{\displaystyle O}{\|}}{P}\text{—}(OR^1)_{3-n} \qquad (I)$$

(wherein $R^1$ is selected from alkyl, allyl, aryl, aralkyl, alkaryl, acryloxyalkyl and methacryloxyalkyl radicals of 1 to 18 carbon atoms and their derivatives and n is 1 or 2) and derivatives of phosphorous acid represented by the following formula

$$(HO)_n\text{—}P\text{—}(OR^1)_{3-n} \qquad (II)$$

(wherein $R^1$ and n are respectively the same as defined in the above mentioned formula (I)).

10. A process for producing methacrylic resin having a solar radiant energy absorbing property according to claim 8, wherein the carboxylic acid is selected from group of consisting of formic acid, acetic acid, propionic acid, hexanoic acid, octanoic acid, decanoic acid, lauric acid, stearic acid, 2-ethylhexanoic acid, naphthenic acid and benzoic acid.

11. A process for producing methacrylic resin having a high solar radiant energy absorbing property according to claim 7, wherein at least one of the radical polymerization initiator are selected from the group consisting of azo-compound and organic peroxide.

12. A process for producing methacrylic resin having a high solar radiant energy absorbing property according to claim 7, wherein at least one organic peroxide selected from the group consisting of di-tert.-butyl peroxide, tert.-butyl cumyl peroxide, dicumyl peroxide, α,α'-bis(tert.-butyl peroxy) hexane, and 2,5-dimethyl-2,5-di(tert.-butyl peroxy) hexine coexists with other radical polymerization initiator.

13. A process for producing methacrylic resin having a high solar radiant energy absorbing property according to claim 7, wherein from 0.01 to 1.0 part by weight of an ultraviolet ray absorbent is added per 100 parts by weight of methacrylic resin.

14. A process for producing methacrylic resin having a high solar radiant energy absorbing property according to claim 7, wherein from 0.0001 to 0.05 part by weight of carbon black is added per 100 parts by weight methacrylic resin.

15. A methacrylic resin having a high solar radiant energy absorbing property according to claim 1, wherein the visible light transmission thereof is equal to or higher than the solar radiant energy transmission thereof.

16. A methacrylic resin having a high solar radiant energy absorbing property according to claim 15, wherein the visible light transmission thereof is 70% or more and the solar radiant energy transmission is 70% or less for plate 5 mm in thickness.

17. A methacrylic resin having a high solar radiant energy absorbing property according to claim 16, wherein the visible light transmission thereof is 70% or more and the solar radiant energy transmission thereof is 60% or less for a plate 5 mm in thickness.

18. A methacrylic resin having a high solar radiant energy absorbing porperty according to claim 15, wherein the visible light transmission thereof is 60% or more and the solar radiant energy transmission thereof is 60% or less for plate 5 mm in thickness.

19. A process for producing methacrylic resin having a high solar radiant energy absorbing property according to claim 7, wherein the visible light transmission of the resin is equal to or higher than the solar radiant energy transmission of the same.

20. A process for producing methacrylic resin having a high solar radiant energy absorbing property according to claim 19, wherein the visible light transmission of the resin is 70% or more and the solar radiant energy transmission of the resin is 70% or less for plate 5 mm in thickness.

21. A process for producing methacrylic resin having a high solar radiant energy absorbing property according to claim 20, wherein the visible light transmission of the resin is 70% or more and the solar radiant energy transmission of the resin is 60% or less for a plate 5 mm in thickness.

22. A process for producing methacrylic resin having a high solar radiant energy absorbing property according to claim 19, wherein the visible light transmission of the resin is 60% or more and the solar radiant energy transmission of the resin is 60% or less for a plate 5 mm in thickness.

* * * * *